United States Patent [19]

Grigsby et al.

[11] 4,242,362
[45] Dec. 30, 1980

[54] PROCESS FOR MANUFACTURING CHEESE

[76] Inventors: Charles O. Grigsby; David R. Grigsby, both of 751 N. Jackson, Rte. 107, Pittsfield, Ill. 62363

[21] Appl. No.: 928,386

[22] Filed: Jul. 27, 1978

[51] Int. Cl.³ ............................................. A23C 19/02
[52] U.S. Cl. ........................................ 426/40; 426/36
[58] Field of Search ............................ 426/36, 40, 582

[56] References Cited

U.S. PATENT DOCUMENTS

| | | | |
|---|---|---|---|
| 2,494,636 | 1/1950 | Stine | 426/36 |
| 2,727,823 | 12/1955 | Tulane et al. | 426/36 |
| 2,864,704 | 12/1958 | Feutz, Jr. et al. | 426/36 |
| 2,871,126 | 1/1959 | Smith et al. | 426/36 |
| 3,020,163 | 2/1962 | Stine | 426/36 |

*Primary Examiner*—David M. Naff
*Attorney, Agent, or Firm*—August E. Roehrig, Jr.

[57] ABSTRACT

Cheese having eyes such as Swiss cheese is produced by a process which results in more uniform eye size and eye distribution, and which requires substantially reduced curing time. In the process, pressing of the curd is carried out for about 2 to 4 hours at 80° F. to 130° F., salting of the curd is carried out in a super saturated salt brine in excess of 85% salinity reading for 30 minutes to 4 hours at about 80° to 130° F. and curing is carried out by aging the curd for about 6 to 24 hours and thereafter force drying the curd with high velocity air at a temperature of about 90° to 300° F. for about 1 to 60 minutes.

24 Claims, No Drawings

PROCESS FOR MANUFACTURING CHEESE

BACKGROUND OF THE INVENTION

This invention relates in general to the manufacture of cheese and, in particular, to the manufacture of cheese made by the Emmenthaler process, more commonly known in the United States as Swiss cheese.

Swiss cheese is made by a series of time honored steps which trace their origin back several hundred years to Canton Bern, in the valley of the Emme, Switzerland. This process results in a cheese characterized by a nut-like flavor and cells or eyes formed during the curing process by expanding gases generated by bacterial action within the body of the cheese. According to the usual procedure, the milk used in the manufacture of cheese is first clarified to remove sediment, disperse clusters of fat, and to increase the elasticity of the curd in the cheese, all of which contribute to improved eye formation. After the milk is clarified, it is usually desirable to standardize the milk to a uniform fat content in the range of about 2.8 percent to about 3.5 percent so that the cheese product will contain approximately 45 percent of fat in its dry matter. The milk is then placed in a kettle or vat and warmed to the proper temperature for setting, normally between 85° and 95° F., whereafter the milk is innoculated with a suitable culture of the type necessary to produce the characteristic nutty flavor of Swiss cheese. The cultures may include, for example, *Lactobacillus bulgaricus, Streptococcus thermophillus,* and *Propionibacterium shermanii.* Rennet is then added to coagulate the milk and to set it into a curd. "Curd" is a term of art referring to the solids portion and "whey" is a term of art referring to the remaining liquid.

As soon as the curd has attained the desired firmness, usually determined by the eye of an experienced cheese maker, it is cut into small pieces with what is known in the art as a Swiss cheese harp. The pieces of curd are then cooked at a temperature range of about 120° to 130° F. while being continuously stirred in the whey until the desired moisture level, firmness, and density as determined by the cheese maker is achieved.

At this point the curd is separated from the whey by a step known in the art as "dipping". This is accomplished by passing a heavy coarsely woven cloth under the curd in the vat so that the cloth may be formed into a large bag. The curd is removed from the vat and the excess whey is allowed to drain from the curd into the vat. The curd is then "hooped" by placing the cloth containing the curd in a circular hoop having a depth of 6 to 8 inches. The cloth is drawn up around the curd, and the curd is pressed into the hoop to shape it and promote whey drainage. Thereafter, the curd is kept under pressure and turned at intervals overnight so that any holes or air cavities formed in the body of the curd are removed.

The next morning, after the curd has been pressed in the hoop overnight, it is placed in a salt brine solution at a temperature of 50° to 60° F. for two to four days. The brine salts the exterior surface of the curd and works into the body of the curd during the curing operation. Thereafter, the curd is removed from the brine and cured by alternately storing it at cold (approximately 55° F.) and warm (approximately 75° F.) temperatures accompanied by repeated washings and saltings. Eye formation should commence by the time the cheese is about three weeks old. However, the curd is not considered fully cured until optimal eye formation is attained which may require a curing period of from 60 days to 6 months or longer.

It is desirable to produce Swiss cheese having eyes of uniform size and distribution throughout the body of the cheese. One attempt to produce such a Swiss cheese is disclosed in J. B. Stine, U.S. Pat. No. 3,020,163, "MANUFACTURE OF CHEESE". This patent discloses a process wherein the so-called "one-sidedness" or non-uniform eye distribution within the cheese is minimized by a rapid cooling of the curd in the whey from the cooking temperature (120°–135° F.) to a temperature in the range of 90° to 110° F. just prior to removing the curd from the whey. While this process may be successful in improving the uniformity of eye formation, the process still requires that the cheese be cured for a relatively lengthy period which necessitates storage space requirements and results in delays in marketing the final cheese product.

SUMMARY OF THE INVENTION

It is, therefore, an object of the present invention to improve the process for the manufacture of Swiss cheese.

Another object of this invention is to manufacture a Swiss cheese having uniform eye size and eye distribution with the eye formation extending from the center to the surface of the cheese mass.

A further object of this invention is to improve the flavor and the texture of the cheese.

Still another object of this invention is to reduce the salt or sodium content required to control the eye formation in the cheese mass.

Another object of this invention is to provide uniform distribution of the salt throughout the cheese mass.

A further object of this invention is to substantially reduce the total manufacturing time for the processing of Swiss cheese.

Still another object of this invention is to substantially reduce the curing time required for the manufacture of Swiss cheese.

Another object of the present invention is to substantially reduce the storage space requirements for curing Swiss cheese.

Still another object of the present invention is to improve the process for the manufacture of Swiss cheese to rapidly bring the cheese product to market.

These and other objects are attained in accordance with the present invention wherein there is provided an improved process for manufacturing Swiss cheese which reduces the time required for curing and results in a more uniform eye formation. This process is believed to be possible through the time and temperature control during immersion of curds in a salt brine solution.

DESCRIPTION OF THE PREFERRED EMBODIMENT

Referring now to the improved Swiss cheese manufacturing process of the present invention, the initial steps of the improved process are similar to those known in the art. However, first the milk is pasteurized by standard high temperature, short-time procedures. The milk is then brought to normal setting temperatures (85°–95° F.), innoculated with the cultures normally found in all Swiss cheese, plus Streptococcus lactic culture to replace those destroyed by pasteurization, set with Rennet or other coagulants, and cut or harped. The curd is then cooked in a temperature range of approximately 100° to 135° F., preferably approximately 115° to approximately 125° F., until the desired firmness, density, and moisture content (as determined by the cheesemaker) is attained. The curd is then dipped from the whey leaving a reasonable amount of whey in the dipping bag to prevent too fast of cooling and to permit the proper knitting of the curd particles to form a curd mass which will allow proper eye formation for mechanical slicing.

According to the present invention a block of curd of a suitable size, for example, approximately 40 pounds is then placed in a hoop which has a cheesecloth lining. The cheesecloth is brought up around the curd and the curd is pressed, turned and pressed again. The block is then cut into four approximately rectangular prints of roughly equal size, preferably having a cross section of approximately 4" by 6", each of which weighs approximately 10 pounds. The prints are wrapped in cheesecloth and pressed again. Pressing of the prints promotes whey drainage and removes most cavities formed in the body of the cheese, while the cheesecloth promotes uniform surface texture. From the point of which the curd is dipped from the whey to the end of the pressing is about 3 hours. During this interval the curd is kept at a temperature of approximately 90° to approximately 130° F., preferably approximately 95° to approximately 110° F., and the acidity is increased to a pH level of approximately 5.85.

After pressing, the cheesecloth wrapping is removed and the curd is placed in a super saturated salt brine bath in excess of 85% salinity reading for approximately 1 hour at a temperature of 120° F. The salting temperature can be varied between approximately 80° and approximately 130° F., depending upon the salting time, which is preferably in the range of approximately 30 minutes to approximately 4 hours. From the brine, the curd or cheese is then placed in a suitable package, for example, an unsealed shrink bag, and placed on end in a box or form, subjected to pressure by placing a 1 to 3 pound weight, preferably 2 pounds thereon, and allowed to age approximately 20 hours from dip time under controlled, relatively warm conditions, preferably between 70° and 90° F. During the aging process, whey is expelled from the curd into the bag and is later poured off.

After the aging period, the print is placed on a conveyor grid or, alternatively, placed in a drying tunnel and, under controlled conditions, is forced dried by being exposed to a uniform blast of heated air at a temperature of approximately 90° to approximately 300° F., preferably approximately 170° F., for preferably 3 to 5 minutes. The cheese is thereafter packaged in a vacuum sealed shrink bag and shipped to market.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In the process of manufacturing cheese having eyes formed therein including the steps of clarifying milk to remove sediment, standardizing the clarified milk to a uniform fat content in the range of about 2.5 to about 3.5 percent, setting the milk with a suitable composition of innoculants and coagulants to form a curd, cutting the curd, cooking the cut curd at a temperature of about 100° to about 135° F. until it acquires the desired characteristics, separating the curd from the whey, hooping the curd to shape it into the desired form, alternatively pressing and turning the curd to remove holes or cavities formed therein, salting the curd in a salt brine solution for about 2 to 4 days at a temperature of about 50° to about 60° F., and curing the curd for about 60 days to about 6 months to produce cheese having eyes formed therein, wherein the improvement comprises carrying out said pressing of the curd for about 2 to 4 hours at a temperature of about 80° to 130° F., said salting of the curd being carried out in a super saturated salt brine solution in excess of about 85% salinity reading for about 30 minutes to about 4 hours at a temperature of about 80° to about 130° F., said curing of the curd being effected by aging the cheese for about 6 to about 24 hours, and thereafter force drying the cheese using high velocity air at a temperature of about 90° to about 300° F. for about 1 to about 60 minutes.

2. The process of manufacturing cheese as defined in claim 1 wherein the curd is pressed for 3 hours.

3. The process of manufacturing cheese as defined in claim 1 wherein the curd is pressed at a temperature of about 95° to about 100° F.

4. The process of manufacturing cheese as defined in claim 1 wherein the curd is salted in a super saturated salt brine solution for about 1 hour at a temperature of about 120° F.

5. The process of manufacturing cheese as defined in claim 1 wherein the curd is salted in a super saturated salt brine solution for about 4 hours at a temperature of about 80° F.

6. The process of manufacturing cheese as defined in claim 1 wherein the curd is salted in a super saturated salt brine solution for about 3 hours at a temperature of about 90° F.

7. The process of manufacturing cheese as defined in claim 1 wherein the cheese is aged under pressure.

8. The process of manufacturing cheese as defined in claim 1 wherein the cheese is aged under a pressure of about 0.07 to 0.20 psi.

9. The process of manufacturing cheese as defined in claim 1 wherein the cheese is aged under a pressure of about 0.13 psi.

10. The process of manufacturing cheese as defined in claim 1 wherein the cheese is aged under a pressure of about 0.08 psi.

11. The process of manufacturing cheese as defined in claim 1 wherein the cheese is aged for about 20 hours.

12. The process of manufacturing cheese as defined in claim 1 wherein the cheese is packaged in a vacuum seal shrink pack.

13. In the process of manufacturing cheese having eyes formed therein including the steps of clarifying milk to remove sediment, standardizing the clarified milk to a uniform fat content in the range of about 2.5 to about 3.5 percent, setting the milk with a suitable composition of innoculants and coagulants to form a curd, cutting the curd, cooking the cut curd at a temperature of about 100° to about 135° F., until it has acquired the desired characteristics, separating the curd from the whey, hooping the curd to shape it into the desired form, alternatively pressing and turning the curd to remove holes or cavities formed therein, salting the curd in a salt brine solution for about 2 to about 4 days at a temperature of about 50° to about 60° F., and curing the curd for about 60 days to about 6 months to produce cheese having eyes formed therein, wherein the improvement comprises carrying out said pressing of the curd for about 2 to about 4 hours at a temperature of about 90° to about 130° F., said salting of the curd being carried out in a super saturated salt brine solution in excess of about 85% salinity reading for about 30 minutes to about 4 hours at a temperature of about 80° to about 130° F., said curing of the curd being effected by placing the cheese in an unsealed bag, aging the cheese for about 6 to about 24 hours, draining the excess whey from the curd, and thereafter force drying the cheese in a drying tunnel using high velocity air at a temperature of about 90° to about 300° F. for about 1 to about 60 minutes.

14. The process of manufacturing cheese as defined in claim 13 wherein the curd is pressed for 3 hours.

15. The process of manufacturing cheese as defined in claim 13 wherein the curd is pressed at a temperature of about 95° to about 100° F.

16. The process of manufacturing cheese as defined in claim 13, wherein the curd is salted in a super saturated salt brine solution for about 1 hour at a temperature of about 120° F.

17. The process of manufacturing cheese as defined in claim 13, wherein the curd is salted in a super saturated salt brine solution for about 4 hours at a temperature of about 80° F.

18. The process of manufacturing cheese as defined in claim 13, wherein the curd is salted in a super saturated salt brine solution for about 3 hours at a temperature of about 90° F.

19. The process of manufacturing cheese as defined in claim 13 wherein the cheese is aged under pressure.

20. The process of manufacturing cheese as defined in claim 13 wherein the cheese is aged under a pressure of about 0.07 to about 0.20 psi.

21. The process of manufacturing cheese as defined in claim 13 wherein the cheese is aged under a pressure of about 0.13 psi.

22. The process of manufacturing cheese as defined in claim 13 wherein the cheese is aged under a pressure of about 0.08 psi.

23. The process of manufacturing cheese as defined in claim 13 wherein the cheese is aged for about 20 hours.

24. The process of manufacturing cheese as defined in claim 13 wherein the cheese is packaged in a vacuum sealed shrink pack.

* * * * *